United States Patent [19]

Ishikawa et al.

[11] Patent Number: 5,281,963
[45] Date of Patent: Jan. 25, 1994

[54] INFORMATION PROCESSING EQUIPMENT HAVING COMMUNICATION CAPABILITIES AND WHICH CALCULATES LOAD FACTOR

[75] Inventors: Yutaka Ishikawa; Masami Katagiri, both of Tokyo, Japan

[73] Assignee: Oki Electric Industry Co., Ltd., Tokyo, Japan

[21] Appl. No.: 770,927

[22] Filed: Oct. 4, 1991

[30] Foreign Application Priority Data

Oct. 4, 1990 [JP] Japan .................. 2-264951

[51] Int. Cl.$^5$ .................. H04Q 1/18; H04J 3/02
[52] U.S. Cl. .................. 340/825.5; 371/9.1; 370/85.6
[58] Field of Search .................. 340/825.5, 825.51; 371/9.1, 62; 370/85.6, 95.1

[56] References Cited

U.S. PATENT DOCUMENTS

4,868,818  9/1989  Madan et al. .................. 371/9.1
5,155,851 10/1992  Krishnan .................. 364/DIG. 1

*Primary Examiner*—Donald J. Yusko
*Assistant Examiner*—John E. Giust
*Attorney, Agent, or Firm*—Spencer, Frank & Schneider

[57] ABSTRACT

The present invention relates to information processing equipment having communication capabilities capable of executing a communication protocol processing at high speed and comprising a main processor and a communication processor. If a load factor of the main processor is higher than a predetermined threshold value, the main processor executes the communication protocol processing and if the load factor of the main processor is lower than the predetermined threshold value, the communication processor executes the communication protocol processing.

8 Claims, 9 Drawing Sheets

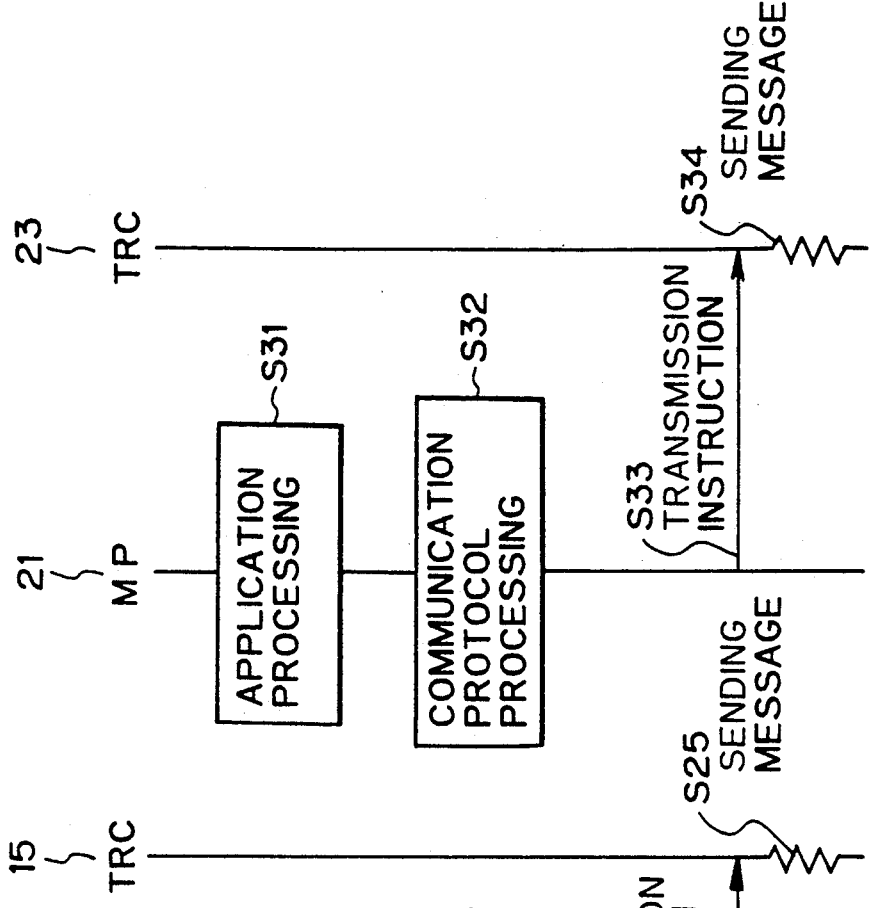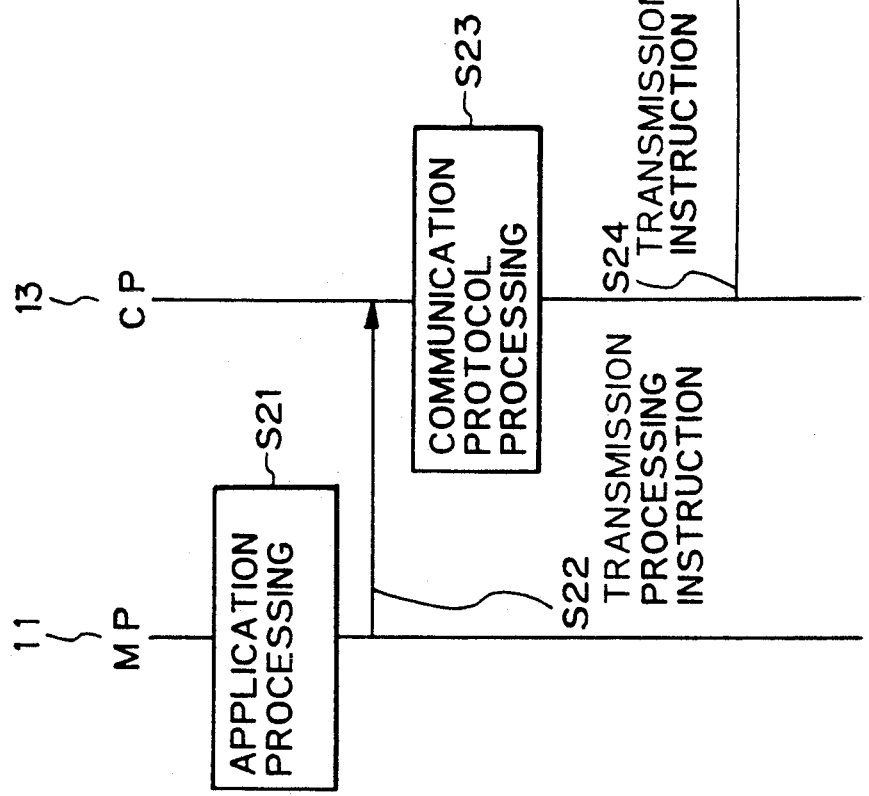

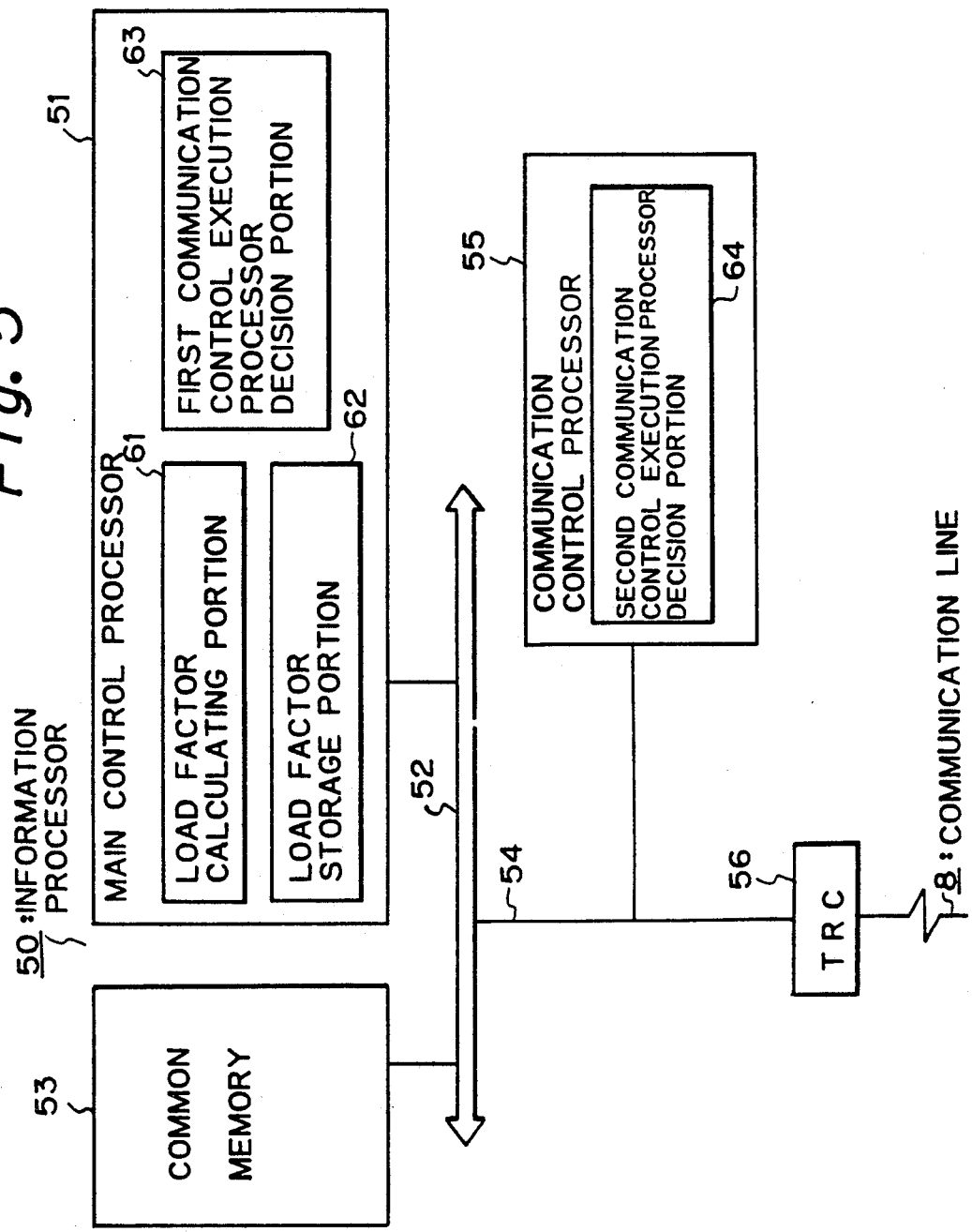

INFORMATION PROCESSING EQUIPMENT HAVING COMMUNICATION CAPABILITIES AND WHICH CALCULATES LOAD FACTOR

BACKGROUND OF THE INVENTION

1. Field of the Invention

The present invention relates to information processing equipment having communication capabilities and capable of executing communication protocol processing at high speed.

2. Description of the Related Art

Information processing equipment capable of communicating with a host processor and processing both the communication and the subsequent information has been utilized in various fields. Some examples of information processing equipment having communication capabilities are an online terminal, a data base server, and a multimedia terminal.

An arrangement of conventional information processing equipment having communication capabilities will be described with reference to FIG. 1.

First and second information processing equipment having communication capabilities (hereinafter referred to as simply first and second information processing equipment) is illustrated in FIG. 1.

The first information processing equipment 1 comprises a main processor (hereinafter referred to as MP) 11, a communication control processor (hereinafter referred to as CP) 13 connected to the MP 11 by way of a system bus 12. A transmitter and receiver controller (hereinafter referred to as TRC) 15 is connected to the CP 13 by way of a local bus 14.

The MP 11 comprises a main processor for processing an application which is previously set by the first information processing equipment 1. The CP 13 comprises a known communication control processor for processing a communication protocol which is received or sent by a communication line 16. The TRC 15 executes the circuit-related processing of the communication protocol. The TRC 15 comprises a communication control Large Scale Integrated (LSI) Circuit for reassembling and deblocking the message and effecting a serial/parallel conversion. The LSI circuit also comprises a driver/receiver for matching a signal format in the information processing equipment 1 with a signal format on the communication line 16 and the like.

The components of the first information processing equipment 1 execute the circuit-related processing, the communication protocol processing and the application processing.

These levels of processing will be described with reference to seven layers of an Open Systems Interconnection (OSI) reference model stipulated by International Organization for Standardization (ISO). The circuit-related processing corresponds to the first and second layers and the communication protocol processing corresponds to the third to seventh layers (refer to FIG. 2). The application processing means processes data which is delivered to the information processing equipment 1, which may include data processing relating to a data base, word processor, or business calculation.

The second information processing equipment 2 comprises an MP 21 and a TRC 23 connected to the MP 21 by way of a system bus 22. The TRC 23 is the same as the TRC 15. The MP 21 comprises a processor having both the functions of the MP 11 and the CP 13 of the first information processing equipment 1. That is, the MP 21 executes both the application processing and the communication protocol processing.

Operations of the first and second information processing equipment 1 and 2 will be described with reference to FIGS. 3 and 4.

FIGS. 3(a) and 3(b) are illustrations showing the method of receiving a message. FIG. 3(a) illustrates the operation of the first information processing equipment 1 and FIG. 3(b) illustrates the operation of the second information processing equipment 2.

In the case of the first information processing equipment 1 as illustrated in FIG. 3(a), when the TRC 15 receives a message from the communication line 16 (Step S1), it notifies the CP 13 of the completion of receiving the message by way of the local bus 14 (Step S2). The CP 13, upon reception of this information, executes the communication protocol processing (Step S3) and notifies, upon completion of the execution thereof, the MP 11 of the completion of the message receiving processing (Step S4). The MP 11, upon reception of this information, executes the application processing (Step S5).

In the case of the second information processing equipment 2 as illustrated in FIG. 3(b), when the TRC 23 receives a message from the communication line 24 (Step S11), it notifies the MP 21 of the completion of receiving the message by way of the system bus 22 (Step S12). The MP 21, upon reception of this information, executes the communication protocol processing (Step S13) and thereafter the application processing (Step S14).

FIGS. 4(a) and 4(b) are illustrations showing the method of sending a message. FIG. 4(a) illustrates the operation of the first information processing equipment 1 and FIG. 4(b) illustrates the operation of the second information processing equipment 2.

In the case of the first information processing equipment 1 as illustrated in FIG. 4(a), assume that there occurred the necessity of sending a message on the communication line 16 as a result of the application processing by the MP 11 (Step S21). In this case, the MP 11 sends a transmission processing instruction to the CP 13 (Step S22). The CP 13, upon reception of this instruction, executes the communication protocol processing for the message to be sent (Step S23) and sends a message transmission instruction to the TRC 15 (Step S24). The TRC 15, upon reception of this instruction, reassembles the message to match the standard format of the communication line 16 and thereafter sends the message (Step S25).

In the second information processing equipment 2 as illustrated in FIG. 4(b), assume that there occurred the necessity of sending a message on the communication line 24 as a result of the application processing by the MP 21 (Step S31). In this case, the MP 21 executes the communication protocol processing (Step S32) for the message to be sent and thereafter sends a transmission instruction to the TRC 23 (Step S33). The TRC 23, upon reception of this instruction, reassembles the message to match the standard format of the communication line 24 and thereafter sends the message (Step S34).

SUMMARY OF THE INVENTION

It is an object of the present invention to provide information processing equipment capable of executing a communication protocol processing at high speed.

It is another object of the present invention to provide information processing equipment capable of executing the communication protocol processing at high speed without attaching any special hardware.

To achieve the above objectives, the information processing equipment according to the present invention comprises a load factor calculating portion for calculating a load factor of a main control processor which controls the information processing equipment, a load factor storage portion for storing the calculated load factor, and an execution processor decision portion for comparing the stored load factor with a standard load factor and based on this comparison deciding on an executing processor for executing the communication protocol processing.

With such an arrangement, when the load factor of the main control processor is low and the load applied to the main control processor is light, the communication protocol processing is executed by the main processor. On the other hand, when the load factor of the main processor is high and the load applied to the main processor is heavy, the communication protocol is executed by the communication control processor. Since the main control processor can process at high speed compared with the communication control processor, the communication protocol processing can be executed at high speed by the main control processor.

BRIEF DESCRIPTION OF THE DRAWINGS

FIG. 4 shows a transmission operation according to the conventional information processing equipment;

FIG. 5 is a block diagram of information processing equipment according to the present invention;

DESCRIPTION OF THE PREFERRED EMBODIMENT

Figure 1:
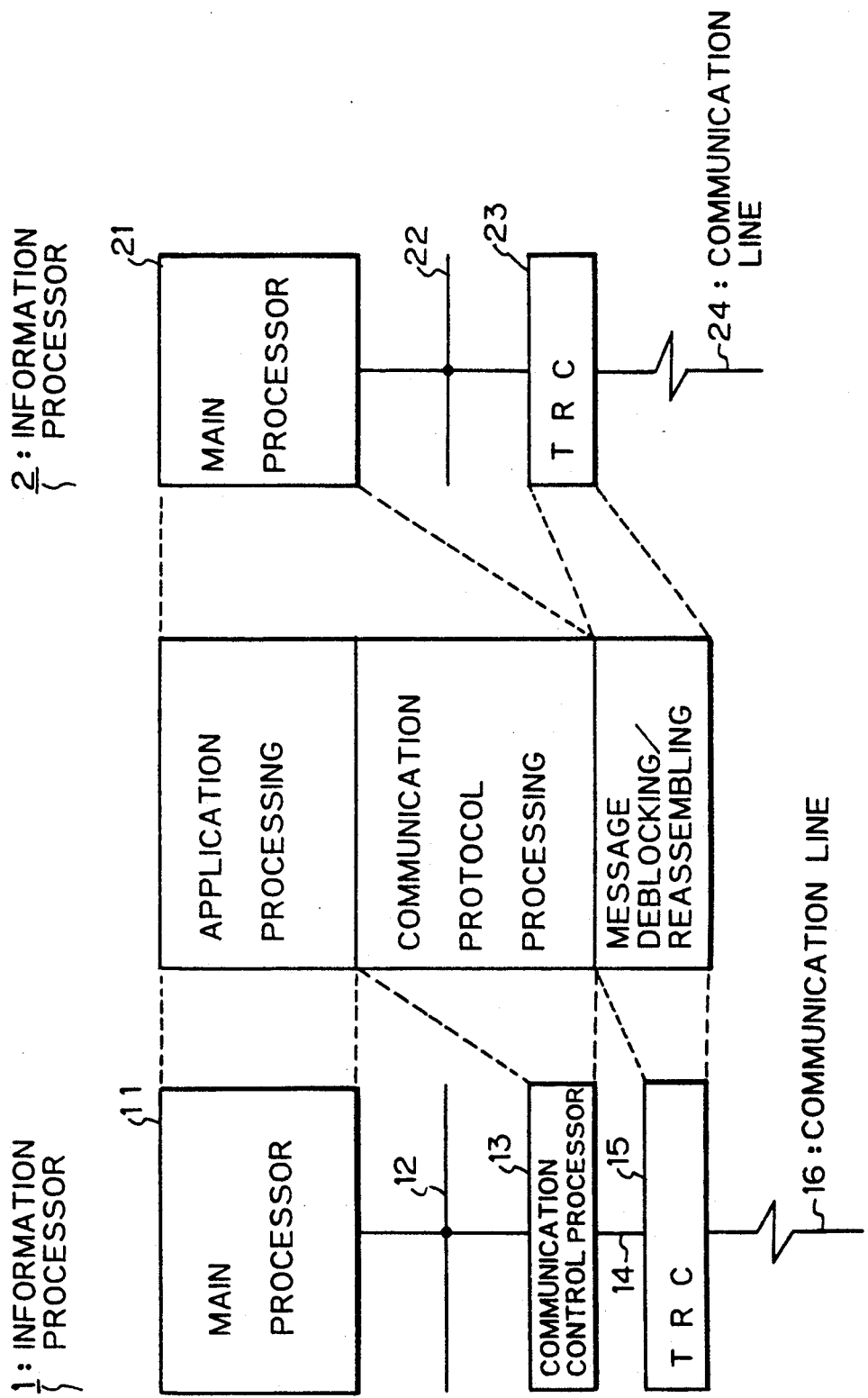
FIG. 1 shows the arrangement of a conventional information processor.
Figure 2:
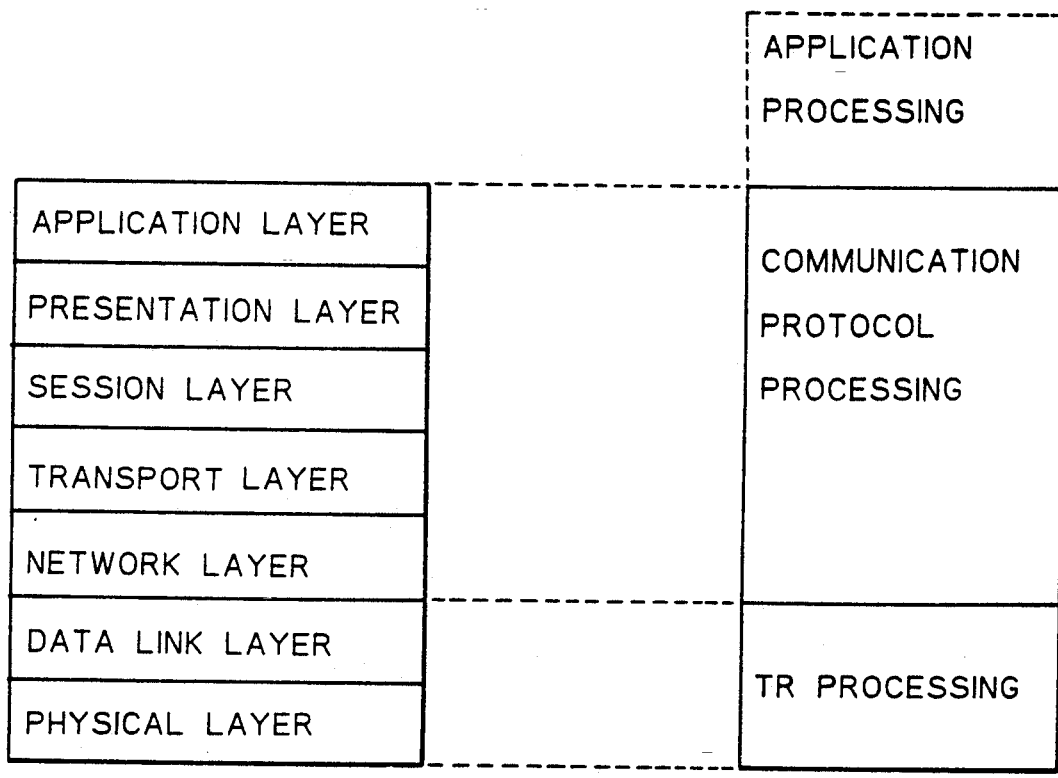
FIG. 2 shows the relation between the seven layers of an OSI reference model and the corresponding levels of processing of the information processing equipment.
Figures 3A, 3B:
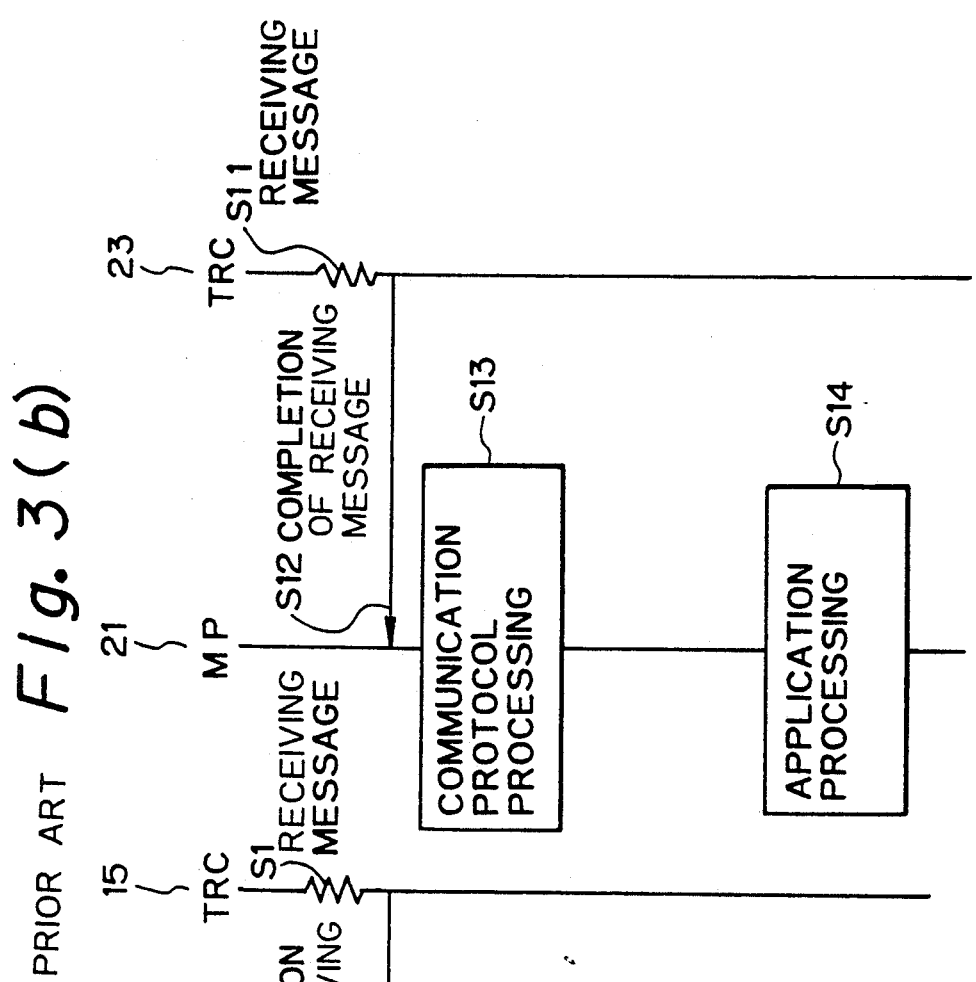
FIG. 3 shows a receiving operation according to the conventional information processing equipment.

FIG. 5 is the block diagram of the information processing equipment according to the present invention.

The information processing equipment 50 comprises a main control processor (MP) 51, a common memory 53 connected to the MP 51 by way of a system bus 52, a communication control processor (CP) 55 and a transmitter and receiver controller (TRC) 56 respectively connected to both the MP 51 and the common memory 53 by way of a local bus 54. The TRC 56 is connected to a communication line 8 which is connected to a host processor, not shown.

The MP 51 comprises a load factor calculating portion 61, a load factor storage portion 62 and a first communication control execution processor decision portion 63.

The load factor calculating portion 61 calculates the load factor or the MP 51, i.e., the frequency of executions of the application processing by the MP 51.

Figure 6:
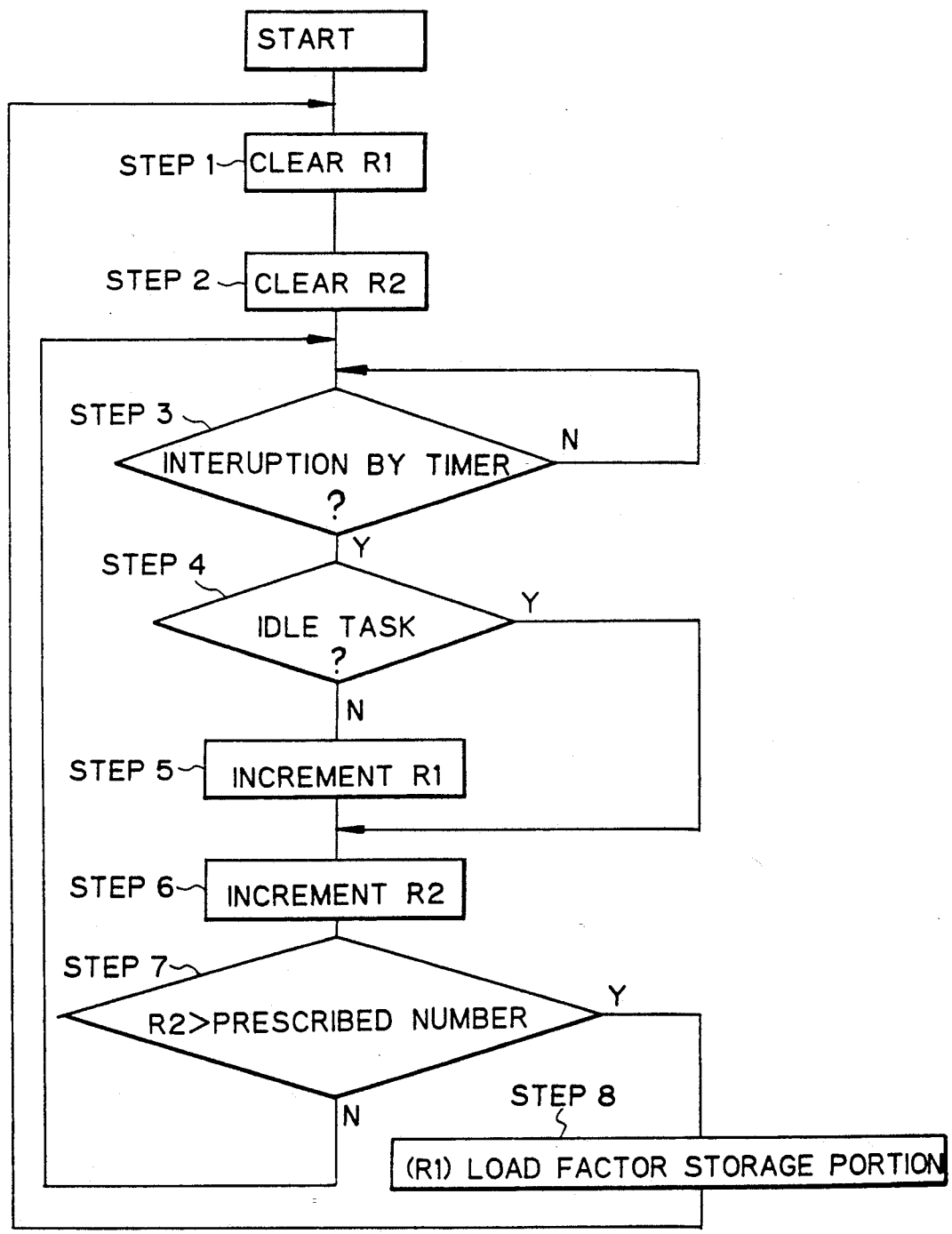
FIG. 6 is a flowchart showing a method of calculating the load factor.

The load factor can be found, for example, by counting the frequency of execution of a task by the MP 51. The flowchart for calculating the load factor is shown in FIG. 6. In STEP 1, the MP 51 clears a register R1 for storing the number of executions of tasks other than idle tasks. An idle task occurs when the MP 51 executes nothing. In STEP 2, the MP 51 clears a register R2 for storing the number of executions of all tasks (including the idle tasks). The MP 51 executes STEPS 1 and 2 just after the operating system is loaded. When STEP 2 is executed, an interrupt by a timer of the operating system is ready (STEP 3). This timer issues a trigger pulse for replacing the current task with the subsequent task. In STEP 4, the MP 51 judges the kind of task to be executed next. If the task to be executed next is not the idle task, the program goes to STEP 5 where the MP 51 increments the register R1 and then to STEP 6 where the MP 51 increments the register R2. If the task to be executed next is the idle task, the program goes directly to STEP 6 where the MP 51 increments the register R2. In STEP 7, the MP 51 determines whether the value in the register R2, i.e., the number of executions of all tasks, exceeds or does not exceed the prescribed number. If the value in the register R2 does not exceed the prescribed number, the program returns to STEP 3. If the MP 51 determines that the value in the register R2 exceeds the prescribed number, the program goes to STEP 8 where the value in the register R1 is stored in the load factor storage portion 62. The value of the register R1 in STEP 8 corresponds to the number of executions of all tasks other than the idle task. When the number of executions of all tasks exceeds the prescribed number, the value of the register R1 in STEP 8 represents the load factor of the MP 51. The program returns to STEP 1 after the load factor is stored in the load factor storage portion 62 in STEP 8.

The load factor storage portion 62 comprises a register and the like for storing the load factor which is calculated by the load factor calculating portion 61. The first communication control execution processor decision portion 63 decides to allow either the main control processor 51 or the communication control processor 55 to execute the communication protocol when the main control processor 51 determines that it is necessary to send a message.

The CP 55 has a second communication control execution processor decision portion 64. The second communication control execution processor decision portion 64 decides to allow either the MP 51 or the CP 55 to execute the communication protocol processing when the TRC 56 receives a message from the communication line 8.

Assuming that the communication control processing in the information processor 50 is equivalent to the communication protocol processing, the operation of the information processing equipment 50 will be described with reference to FIGS. 7 and 8.

Figure 7:
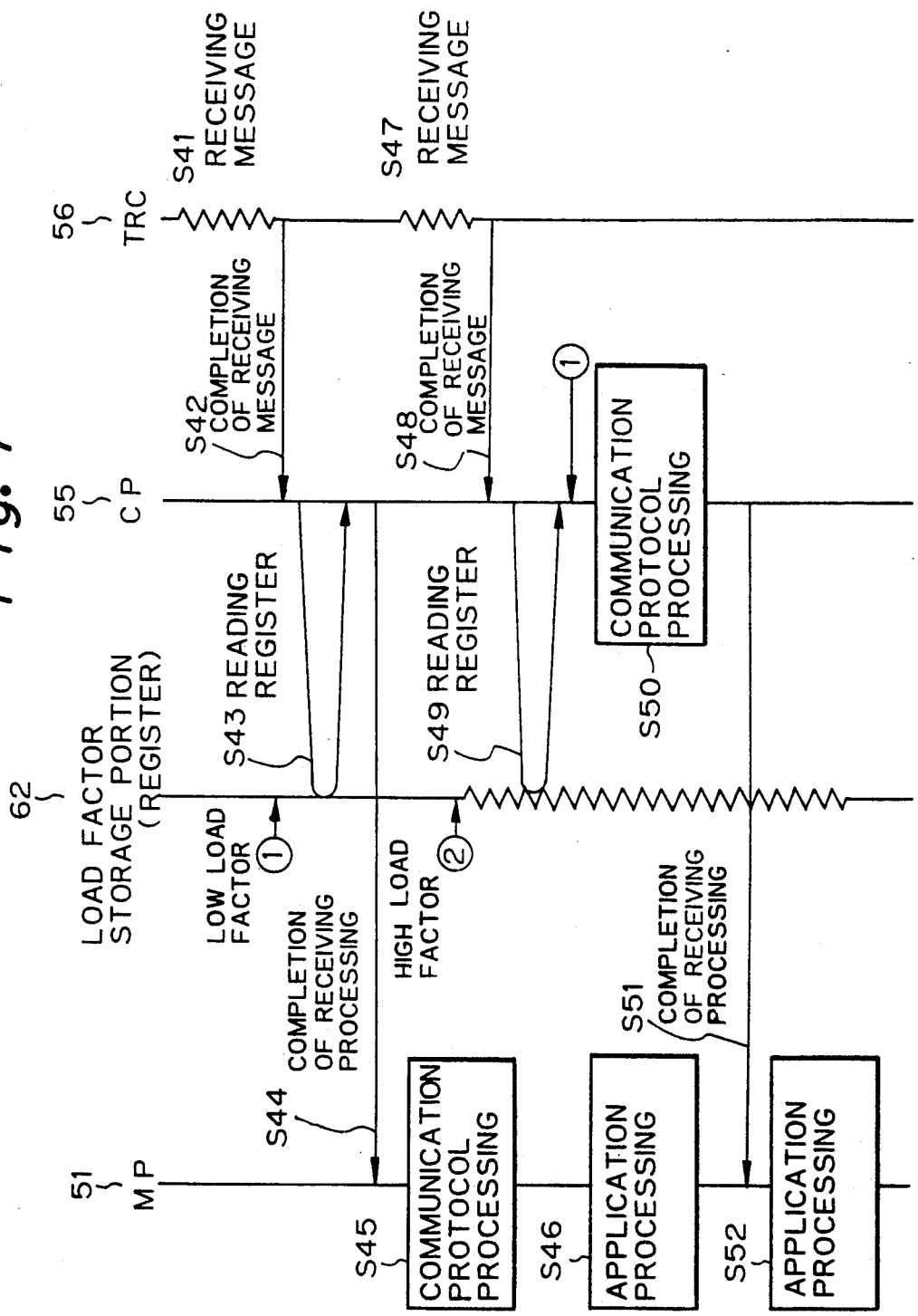
FIG. 7 shows a receiving operation according to the information processing equipment of the present invention.

FIG. 7 shows the receiving operation according to the information processing equipment of the present invention.

In FIG. 7, when the TRC 56 receives the message (Step S41), the TRC 56 notifies the CP 55 of the completion of receiving the message (Step S42). The CP 55 starts to operate the second communication control execution processor decision portion 64 upon reception of the information. The second communication control execution processor decision portion 64 reads the content of the load factor storage portion 62 (Step S43) and determines whether the content thereof represents a high load or not. More specifically, the second communication control execution processor decision portion 64 determines whether the value stored in the load factor storage portion 62 represents the high load if the stored value exceeds a predetermined threshold value and represents the low load if the stored value does not exceed the predetermined threshold voltage. If there is a low load, the CP 55 informs the MP 51 of the completion of receiving the message (Step S44). The MP 51, upon reception of this information, executes the communication protocol processing (Step S45) and thereafter executes the application processing (Step S46).

In a second case, when the TRC 56 further receives a second message (Step S47), it again notifies the CP 55 of the completion of receiving the message (Step S48). The second communication control execution processor decision portion 64 reads the content of the load factor storage portion 62 (Step S49). In this case, the CP 55 determines that the content of the load factor storage portion 62 represents the high load and executes the communication protocol processing (Step S50) and notifies the MP 51 of the completion of processing the received message (Step S51). The MP 51 executes application processing upon reception of this information (Step S52).

The load factor calculating portion 61 successively monitors the load applied to the MP 51 and updates the contents of the load factor storage portion 62. In FIG. 7, the content of the load factor storage portion 62 represents the low load factor at the timing denoted at (1) and represents the high load factor at the timing denoted at (2). Accordingly, the second communication control execution processor decision portion 64 allows the MP 51 to execute the communication protocol processing as the result of Step S43. The second communication control execution processor decision portion 64 allows the CP 55 to execute the communication protocol processing as a result of Step S49.

Figure 8:
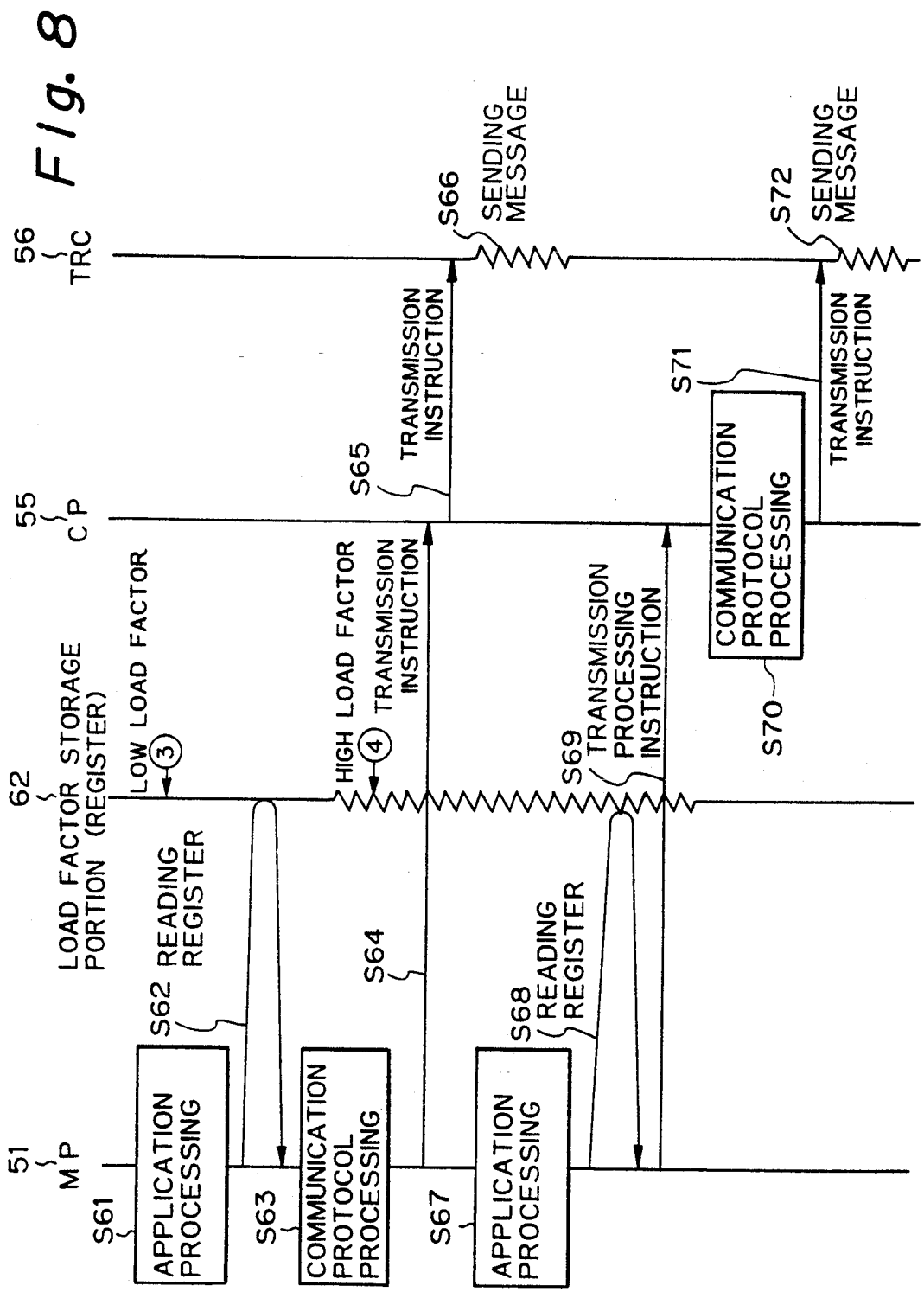
FIG. 8 shows a transmission operation according to the information processing equipment of the present invention.

FIG. 8 shows the transmission operation of a message according to the present invention.

In FIG. 8, assuming that there occurred the necessity of sending a message after the application processing is executed by the MP 51, the first communication control execution processor decision portion 63 of the MP 51 reads the value stored in the load factor storage portion 62 (Step S62) to determine the load factor of the MP 51. If this load factor is less than the predetermined threshold value (as shown in state (3) in FIG. 8), the MP 51 executes the communication protocol processing (Step S63) and thereafter issues a transmission instruction to the CP 55 (Step S64). The CP 55 issues a transmission instruction to the TRC 56 upon reception of transmission instruction from the MP 51 (Step S65). The TRC 56 sends the message to the communication line 8 upon reception of the transmission instruction from the CP 55 (Step S66).

If new application processing is executed by the MP 51 and there occurs the necessity of sending a second message (Step S67), the first communication control execution processor decision portion 63 reads the value stored in the load factor storage portion 62 (Step S68). If the load factor exceeds the predetermined threshold value (as shown in state (4) in FIG. 8), the first communication control execution processor decision portion 63 issues an instruction to the CP 55 so that the CP 55 executes the communication protocol processing (Step S69). The CP 55 executes the communication protocol processing upon reception of the instruction (Step S70), and issues a transmission instruction to the TRC 56 (Step S71). As a result, the TRC 56 sends the message (Step S72).

In the case of sending a message, as described above, the first communication control execution processor decision portion 63 in the MP 51 decides to allow either the MP 51 or the CP 55 to execute the communication protocol processing.

In the embodiment set forth above, the communication control execution processor decision portion determined that the level of the load factor was either high or low based on a single threshold value. In this method, the processor for executing the communication protocol processing is frequently switched in response to a small load variation close to the threshold value, thereby deteriorating the throughput.

Figures 9, 10:
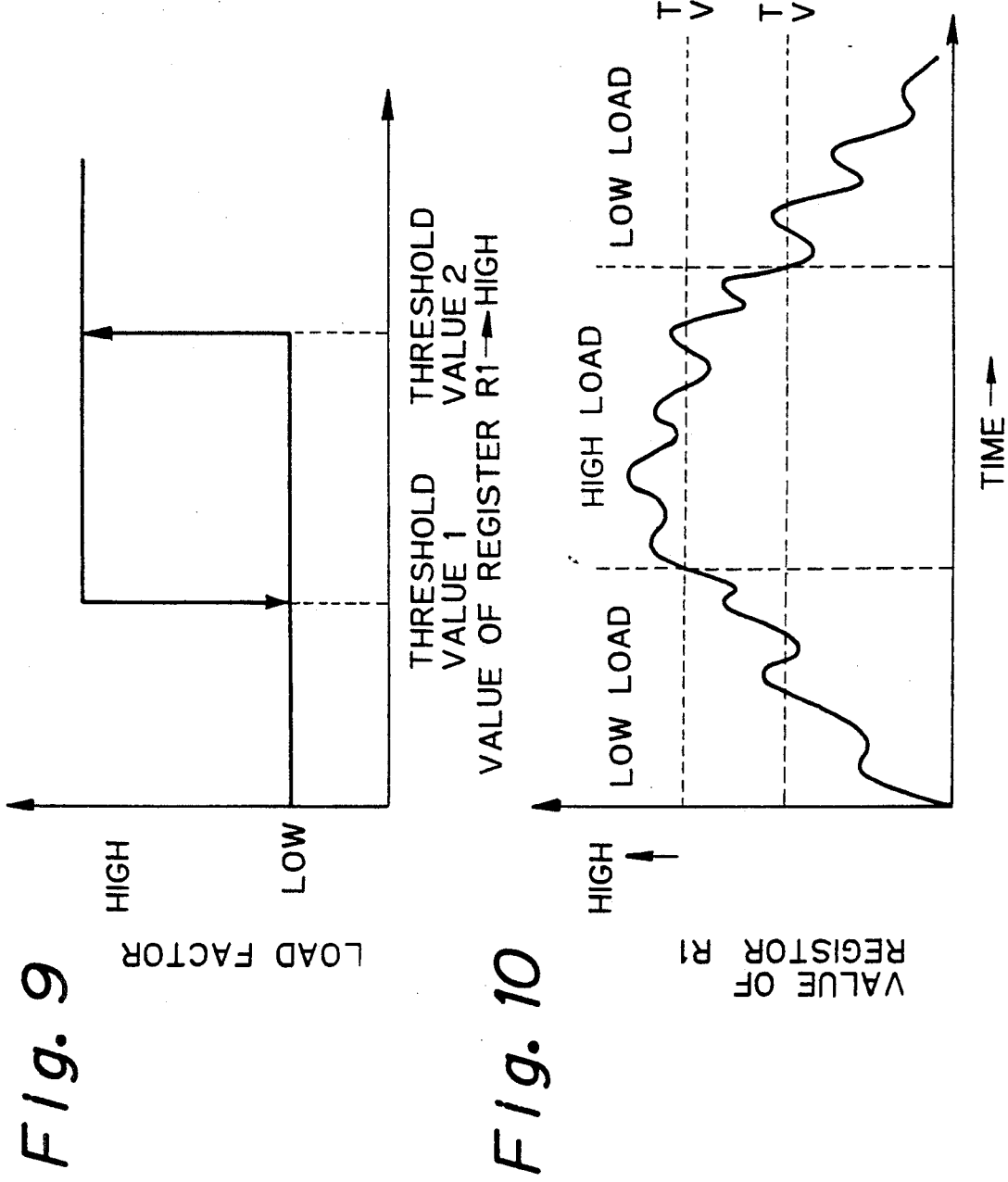
FIG. 9 shows another method of deciding the level of the load factor.
FIG. 10 shows another view of the method of deciding the level of the load factor from FIG. 9.

Accordingly, a preferred embodiment of the invention sets two threshold values, thereby providing hysteresis as illustrated in FIGS. 9 and 10. The first and second communication control execution processor decision portions 63 and 64 determine that the load applied to the MP 51 is high if the value exceeds threshold value 2 in the case where the current load factor is low and determine that the load applied to the MP 51 is low if the value is less than threshold value 1 where the current load factor is high. As a result, the processor for executing the communication protocol processing does not respond to small load variations close to the threshold values, thereby preventing frequent switching between the MP 51 and the CP 55.

The present invention is not limited to the embodiment set forth above.

The load factor storage portion may be provided at the common memory 53 if it can be accessed by the MP 51 and the CP 55 although it is provided at the MP 51 according to the present embodiment.

The communication control execution processor decision portion may be provided at either the MP 51 or the CP 55 for sending and receiving the message although it is provided at both the MP 51 and the CP 55 for sending and receiving the message in the present embodiment.

The present invention can also be used for executing the communication control processing. The communication control processing is not limited to the communication protocol processing but may also include circuit-related processing corresponding to the first and second layers of the OSI reference model.

We claim:

1. An information processing equipment having communication capabilities comprising:
   a communication processor for controlling transmission and reception of a message;
   a main processor for controlling the information processing equipment;
   a load factor calculating means for calculating a load factor based on a load applied to the main processor;
   a memory means for storing the load factor which is calculated by the load factor calculating means; and a decision means for comparing the load factor stored in the memory means with a prescribed value to thereby determine a level of the load factor and selecting a processor for executing a communication protocol processing based on the level of the load factor.

2. An information processing equipment having communication capabilities according to claim 1, wherein the load factor calculating means calculates the load factor by counting the frequency of execution of a task to be executed by the main processor.

3. An information processing equipment having communication capabilities according to claim 2, wherein the load factor calculating means updates the frequency of execution of the task every time an interruption is made by a timer of an operating system.

4. An information processing equipment having communication capabilities according to claim 1, wherein there are low and high levels of the load factor, and the decision means decides to allow the main processor to execute the communication protocol processing if the level of the load factor is low which occurs when the load applied to the main processor is light or the decision means decides to allow the communication processor to execute the communication protocol processing if the level of the load factor is high which occurs when the load applied to the main processor is heavy.

5. An information processing equipment having communication capabilities according to claim 1, wherein the decision means is provided at the main processor and at the communication processor.

6. An information processing equipment having communication capabilities according to claim 4, wherein the decision means is provided at the main processor and at the communication processor.

7. An information processing equipment having communication capabilities according to claim 1, wherein the decision means determines the level of the load factor based on two threshold values.

8. An information processing equipment having communication capabilities according to claim 4, wherein the decision means determines the level of the load factor based on two threshold values.

* * * * *